United States Patent Office 2,898,434
Patented Aug. 4, 1959

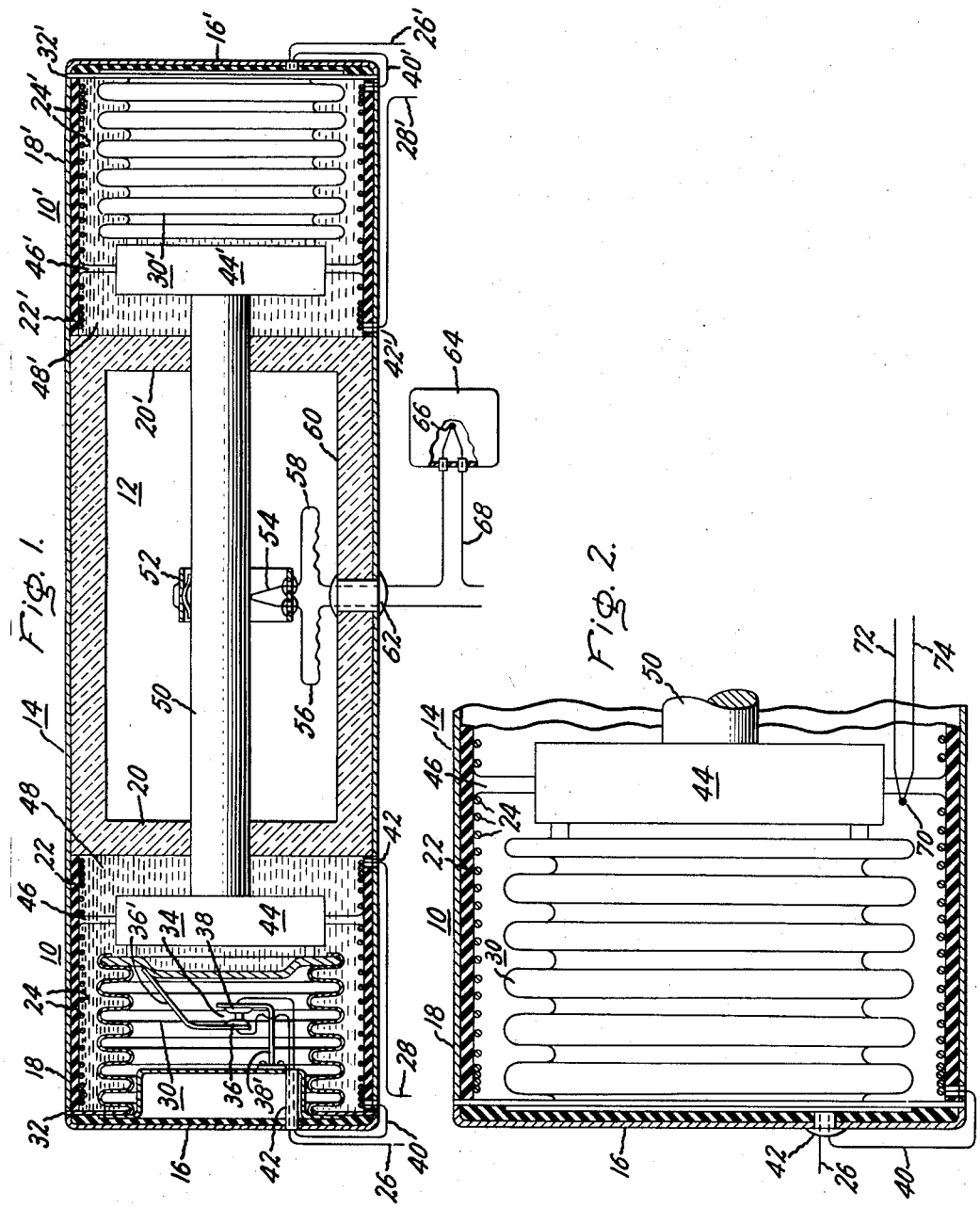
Aug. 4, 1959 — H. H. P. LEMMERMAN ET AL — 2,898,434
ADJUSTABLE REFERENCE DEVICE
Filed Dec. 26, 1956
Inventors:
Weyman S. Crocker,
Harold H.P. Lemmerman,
by Roa D McBurnett
Their Attorney.

2,898,434

ADJUSTABLE REFERENCE DEVICE

Harold H. P. Lemmerman, Schenectady, and Weyman S. Crocker, Scotia, N.Y., assignors to General Electric Company, a corporation of New York Application December 26, 1956, Serial No. 630,569

10 Claims. (Cl. 219—20)

This invention relates to an adjustable reference device and more particularly to an adjustable reference device which is variable over a predetermined range of temperatures and may be adjusted to obtain any specific constant temperature within the predetermined range.

In many types of controls involving the use of thermocouples or other sensors, a constant known temperature must be obtained. This constant known temperature is compared with an unknown temperature to ascertain the unknown temperature. For example, in many processes, various steps are required to be performed at certain specific temperatures. In such processes the temperature reference is set at the desired operating temperature and then the temperature of the process step is compared with the reference temperature. Where such processes have different steps requiring different temperatures, it is desirable that an adjustable temperature reference be used so that the reference may be adjusted to the correct operating temperature during each step of the process.

At the present time in order to obtain a constant known temperature, much special equipment is required. For example, it may be obtained from a temperature sensitive network which has a predictable current flowing through the network. These types of networks are so designed that they provide compensation for changes in various parameters, such as voltage and ambient temperature, so that the apparent reference temperature appears to be constant. Such equipment is generally difficult to adjust to a new reference constant temperature without loss of accuracy. Also, the various components required for such a constant known temperature system are very expensive and are readily damaged by mechanical shocks. Such systems are also limited as to the ambient temperatures within which they may operate. Due to the various types of components utilized in such systems, their reliability is limited to that of the least reliable component and therefore such systems generally have a relatively short operational life.

Therefore, it is an object of this invention to provide a novel temperature reference which may be readily adjustable to any constant reference temperature within a given range.

It is a further object of this invention to provide a novel adjustable temperature reference which is rugged and long-lived and which will operate at very high ambient temperatures.

In copending patent application, Serial No. 620,098, for a Temperature Control Device, filed November 2, 1956, by the present inventors and assigned to the same assignee as the present invention, there is disclosed a novel constant temperature control device utilizing the isothermal volume change of a substance while gaining or losing heat of fusion. The present invention employs similar constant temperature devices to maintain opposite end portions of a heat responsive means at different substantially constant temperatures to provide an accurate rugged, long-lived, adjustable temperature reference.

In carrying out this invention in one form, units are provided, each of which contains a substance in a solid-liquid state at a different temperature than the other, means are provided to maintain the temperatures of these substances constant. A heat responsive means is provided having its opposite end portions in thermal relation with the substance in each housing such that the temperature along the means varies over a range determined by the temperature at each end thereof. The desired constant temperature reference is obtained from such means and may be varied to any temperature within the range.

This invention will be better understood when considered with the following description taken in connection with the accompanying drawing wherein:

Figure 1 is a sectional plan view of one form of an adjustable temperature reference made according to the present invention, Figure 2 is a partial view of one end of the device of Figure 1 partially in section showing a modification thereof.

Referring to the drawing wherein like numerals are used to indicate like parts throughout and especially with reference to Figure 1, this invention in one form is shown as comprising the units 10 and 10', each of which is maintained at a different constant temperature in a manner about to be described. In the illustrated preferred embodiment of this invention, the units 10 and 10' are shown as part of a single device separated by a heat-insulated compartment 12, which may be of any desired size. However, it should be understood that the units 10 and 10' may be made separately and then joined together by a heat-insulated device of the desired size similar to the part 12. A similar construction, in which the units 10 and 10' are separate parts joined by a heat-insulated device, is shown in copending application, Serial No. 626,- 179, for a Voltage Reference Source, filed December 4, 1956, by the present inventors and assigned to the same assignee as the present invention.

As shown, the units 10 and 10' are formed in opposite ends of a metal case 14. Caps 16 and 16' are provided at each end of case 14 and are firmly attached thereto in any desired manner. With the exception of the different temperatures maintained in each, the units 10 and 10' are similar in all respects to each other. The operation of devices similar to the units 10 and 10' is fully described and claimed in the aforementioned copending application, Serial No. 620,098. The construction and operation of unit 10 will be described, it being understood that unit 10' is constructed and operates in the same manner.

The unit 10 comprises a housing formed by the wall 18 of case 14, the end cap 16 and the wall 20 of compartment 12. The case 14 and, therefore, the housing of unit 10 may be of any desired shape. For purposes of this description it will be considered cylindrical in form. The interior of wall 18 of unit 10 is provided with heat insulating means 22. End cap 16 is similarly provided with heat insulating means. The heating insulating means 22 and wall 20 are joined to form a substantially heat-proof seal. A heating means shown in the form of a heating coil 24 is mounted within the unit 10 adjacent to the insulation means 16. It is to be understood that, if desired, the heating means could be provided exteriorly of unit 10. However, the most efficient method to provide heat is by mounting the heating means on the inside of the insulating means 16. The heating means 24 may be in any desired form. For purposes of illustration, it is shown in the form of a heating coil with electric current being provided to its opposite ends by means of electric power leads 26 and 28, which may be connected to any source of electric current.

Mounted on the interior of unit 10 is a volume-sensitive device being shown in the form of a metal bellows 30. The bellows 30 is mounted on a plate 32, the plate 32 being firmly attached and sealed to the wall 18 as, for example, by welding. A switching means generally indicated as 34 is mounted on the inside of the bellows 30. In the drawing, switching means 34 is shown as being provided with contacts 36 and 38 which are opened and closed by operation of the bellows 30, contact 36 being mounted on a support arm 36′ fixedly to one end of the bellows 30 and contact 38 being mounted on a support arm 38′ fixed to the plate 32. Lead 26, which provides electric current to one end of the heating coil 24, is connected to contact 36 of switch 34 while contact 38 is connected to the end of the heating coil 24 by means of the lead 40. Therefore, as the bellows 30 expands, the contacts 36 and 38 are engaged, thereby energizing the heating coil 24 and providing heat to the interior of unit 10. As the bellows member 30 is depressed, the contacts 36 and 38 are opened, deenergizing the heating coil 24. All of the leads are taken out of unit 10 through seals 42, which may be of any desired type; for example, glass seals, to seal the unit 10 and prevent excessive heat losses from the interior of unit 10. The entire unit may be hermetically sealed so that it is not affected by any ambient pressure changes such as may occur at high altitudes.

Mounted within the unit 10 is a vane 44 which is held stationary in unit 10 by a plurality of mounting studs 46 which are preferably of ceramic or other low heat conductive material. Vane 44 may be of any desired shape and is of a material which readily conducts heat, such as aluminum or copper. The interior of unit 10 is filled with a substance diagrammatically indicated by the numeral 48. This substance is in a solid-liquid state at the desired operating temperature of the unit 10 and is one which undergoes a large isothermal volume change while gaining or losing in heat content. As the substance 48 loses heat, portions of its liquid phase begin to solidify, thereby shrinking in volume and allowing the bellows 30 to expand. As the bellows 30 expands, contacts 36 and 38 of switch 34 are closed, thus energizing the heating coil 24 and providing heat to substance 48. As the substance 48 begins to gain heat due to the heat from the heating coil 24, portions of its solid phase began to liquify, thereby expanding and depressing the bellows 30. As the bellows 30 is depressed, the contacts 36 and 38 of switch 34 are opened and the heating coil 22 is deenergized. The solid-liquid substance 48 substantially completely surrounds the vane 44 and maintains it at the temperature of the substance. The isothermal volume change of the substance 48 and the cyclic action of the bellows, the switch, and the heating coil combine to maintain the vane 44 at a substantially constant temperature.

The unit 10′ functions in the identical manner as the unit 10, the substance indicated diagrammatically as 48′ being one that is in a solid-liquid state at some temperature different than the temperature maintained by unit 10. A number of substances which undergo a large isothermal volume change while gaining or losing in heat content are set forth in the above-mentioned copending application, Serial No. 620,098. Of course, it is understood that any substance which undergoes a large isothermal volume change during a change of state can be used for the solid-liquid substance in the units 10 and 10′.

To provide the desired adjustable constant temperature reference, a heat responsive means is used, shown as comprising a rod or bar member 50 extending through the compartment 12 and being attached at either end to the vanes 44, 44′. Rod or bar member 50 is made of a heat conductive material. Besides being attached to vanes 44 and 44′, in the preferred embodiment the ends of the bar 50 extend into the substances 48 and 48′. By this means one end of the bar 50 is maintained at the temperature of the substance 48, while the other end of the bar is maintained at the temperature of substance 48′. Therefore, there is a tempearture gradient maintained along the length of the bar 50 which temperature gradient varies over the range from the temperature of the substance 48 to the temperature of the substance 48′. Of course, it is understood that the ends of the rod or bar 50 do not have to be immersed in the substances 48 and 48′. It is only necessary that the ends be in thermal contact, or have a thermal relation with the substances, such that one end is heated to the temperature of substance 48 while the other end is heated to the temperature of substance 48′. Obviously, there are many ways to accomplish this without immersing the ends of the bar in the substance.

The heat responsive means also comprises a slider member 52 containing temperature sensor means 54, the whole being movably mounted on the rod or bar member 50. The temperature sensor means 54 may be of any desired type, being shown for purposes of illustration only, as a thermocouple. By movement of slider 52 across the bar 50, the sensor means 54 will be able to pick off any desired constant temperature between the range of the temperature of substance 48 and the temperature of the substance 48′. The bar 50 may be of any desired length, depending upon the accuracy of the adjustable constant temperature reference desired. For instance, if it is desired to obtain a temperature reference within five hundredths of a degree centigrade, then the substances 48 and 48′ are so chosen that the difference between their melting points is a few degrees, such as naphthalene for substance 48, which melts at 79° C., and ethyl nitrite for substance 48′, which melts at 81.5° C. The temperature of the end of bar member 50, within compartment 12, next to the wall 20 will be 79° C., while the temperature of the end of bar 50 next to wall 20′ will be 81.5° C. Of course, there will be a temperature gradient between these two ends of bar 50 covering a temperature range from 79° C. to 81.5° C. With the length of bar 50 within compartment 12 being five inches, the temperature gradient along the bar would be 0.5° C. per inch. A temperature of 80° C. would be obtained by placing the temperature sensor 54 at a point two inches along the bar 50 from the wall 20 and a temperature of 80.05° C. would be found by setting sensor 54 at a point 2.1 inches along the bar 50 from the wall 20. By the above selection of substances, and length of bar member 50, an adjustable constant temperature reference is obtained over the temperature range from 79° C. to 81.5° C., having an accuracy of 0.05° C. Obviously, any desired temperature accuracy could be obtained by the proper selection of the substances 48 and 48′ and utilizing a bar 50 of the appropriate length.

In the illustrated embodiment, the temperature sensor 54 is shown as a thermocouple. The leads 56, 58 from the thermocouple 54 are taken out through the wall 60 of compartment 12 and the case 14 through a seal 62. A sufficient slack on leads 56, 58 is provided within compartment 12 to allow a full movement of slider 52 from wall 20 to wall 20′ along the bar 50 without rupturing the leads 56, 58 or seal 62. The compartment 12 may be evacuated if desired, to allow bar member 50 to more rapidly reach its equilibrium state. The slider 52 may be adjusted in any desired manner, as for example, by magnetic nuts or wobble plates in bellows.

The adjustable temperature reference is shown as being used to monitor the temperature of an unknown area 64. The slider 52 is placed along the bar 50 so that sensor 54 is at the desired constant temperature reference. The area 64 to be monitored is provided with a thermocouple 66 which is of the same type as that used for the temperature sensor 54. Lead 58 from temperature sensor 54 is connected to one lead of thermocouple 66, preferably of the same material as that side of temperature sensor 54 to prevent any undesired thermocouple junctions. A volt meter may then be placed between lead 56 of sensor 54 and lead 68 from the other side of thermocouple 66. When the temperature of area 64 is at the same temperature as that of sensor 54, as set by the slider 52, there will be no voltage output. However, if temperature 64 is at some temperature other than that of sensor 54, there will be a voltage output. This output may be considered as positive when area 64 is at a temperature higher than that set by slider 62 and as negative when area 64 is at a temperature lower than that set by slider 62. Therefore, the temperature of area 64, may be adjusted to raise or lower it to the proper temperature, at which time there will be no voltage output between leads 56 and 68. This adjustable temperature is especially useful when area 64 is a process requiring various steps to be carried out at different temperatures. The temperature sensor 54 can be set at one constant temperature reference for one step of the process and then adjusted to another constant temperature reference for the next step in the process. Substances 48 and 48' will be selected to provide the required temperature range.

Since the output of temperature sensor 54 is a voltage when a thermocouple is used, the adjustable reference device can be readily modified to obtain an adjustable voltage reference. Figure 2 discloses one form of a modification of the adjustable reference device shown in Figure 1. This modification may be used where it is desired to obtain an accurate voltage reference adjustable over a predetermined range. In this modification, a heat responsive means is provided which comprises, in addition to the rod or bar member 50, slider 52 and temperature sensor 54, another temperature sensor means illustrated as thermocouple 70, which is mounted within the unit 10 in thermal contact or thermal relation with the substance 48. The preferred means of obtaining this thermal contact or relation is to immerse the thermocouple 70 within the substance 48. The thermocouple 70 is maintained at the constant temperature of substance 48 by operation of the unit 10 as hereinbefore described. Thermocouple 70 is provided with leads 72, 74, which may be taken out of unit 10 through a heat insulating seal, such as 42, either into compartment 12 through wall 20 or out through side wall 18 of unit 10, as desired. Thermocouple 70 is preferably of the same type as that used for temperature sensor 54. Lead 72 of thermocouple 70 is connected to lead 56 of temperature sensor 54, the leads being of the same material to prevent an undesired thermocouple junction.

This device, as shown in Figure 2, will provide an adjustable voltage reference over a predetermined range which is, of course, determined by the type of thermocouple used in 70 and 54 and by the temperature variation which is available along the bar 50. The desired adjustable voltage reference is obtained as a voltage output between lead 74 of thermocouple 70 and lead 58 of the thermocouple 54. When thermocouple 54 is at the left hand end of the bar 50, it will be at a temperature equal to that of substance 48. At this point there will be no voltage output because both the thermocouple 70 and the thermocouple 54 will be at the same temperature. However, if thermocouple 54 is moved along the bar 50 to any other point thereon, it will be at some temperature different than that of thermocouple 70. This temperature difference may be higher or lower than that of thermocouple 70, depending whether substance 48' has a higher or lower melting temperature than the substance 48. Thus, a voltage output will be obtained between the leads 58 of thermocouple 54 and lead 74 of thermocouple 70. In the copending patent application, Serial No. 626,179, for a Voltage Reference Source, as hereinbefore referred to, it is pointed out the value of a voltage which may be obtained from a number of thermocouples at a temperature difference of over 100° C. Obviously, therefore, in this application, the voltage output will be very small, in the order of one of two millivolts. However, such small voltage outputs are very useful in a number of known applications and it is obvious that in such applications it could well be desirable to be able to vary the voltage output.

Various modifications will appear obvious to those skilled in the art. The embodiments shown are by way of example only since many substitutions may be made without departing from the spirit and scope of the invention as defined in the appended claims.

What is claimed as new and which is desired to secure by Letters Patent of the United States is:

1. An adjustable reference device comprising a first unit containing a substance in a solid-liquid state at one temperature, a second unit containing a substance in a solid-liquid state at a second temperature, means for maintaining the temperatures of said substances substantially constant and heat responsive means connected between said first and second units and having its opposite ends in thermal relation with said substances.

2. An adjustable reference device as claimed in claim 1 in which said means for maintaining the temperatures of said substances substantially constant comprises a heating means in each unit and a volume sensitive device in each unit responsive to volume changes of said substances for controlling said heating means.

3. An adjustable reference device as claimed in claim 1 in which said heat responsive means comprises a heat-conductive bar and a temperature sensor movable along said bar to sample the temperatures of said bar and provide an adjustable temperature reference.

4. An adjustable temperature reference comprising a first unit containing a substance in a solid-liquid state at one temperature, a second unit containing a substance in a solid-liquid state at a second temperature, each said substance undergoing an isothermal volume change during a gain or loss of heat content, means for maintaining said substances at substantially constant temperatures, said means comprising a heating means in each said unit and a volume-sensitive device in each said unit responsive to volume changes of said substances for controlling said heating means, a heat-conductive bar connected between said first and second unit, one end of said bar being in thermal contact with said substance in said first unit, the other end of said bar being in thermal contact with said substance in said second unit, a slider movably mounted on said bar, said slider including a temperature sensor in thermal relation with said bar, whereby as said slider is moved along said bar said temperature sensor registers the temperature of a point on said bar.

5. In an adjustable temperature reference for providing a substantially constant temperature reference adjustable over a temperature range, a heat-conductive bar, a slider adjustably mounted on said bar, a temperature sensor attached to said slider and in thermal contact with said bar, means maintaining each end of said bar at a different substantially constant temperature, whereby the temperature along said bar varies continuously over a range determined by the temperatures at each end of said bar and said temperature sensor will register the temperature at any point on said bar.

6. In an adjustable temperature reference providing a substantially constant temperature reference adjustable over a range of temperatures, a first unit containing a substance in a solid-liquid state at one temperature, said substance undergoing an isothermal volume change during a change in heat content, a second unit containing a substance in a solid-liquid state at a second temperature, said substance undergoing an isothermal volume change during a change in heat content, means for maintaining the temperature of each said substance substantially constant, said means comprising, in each of said first and second units, a heating means and a volume-sensitive-device responsive to volume changes of each said substances for controlling said heating means, said first and second units being connected by a heat insulated compartment, a heat conductive bar mounted in said compartment, one end of said bar extending into said first unit and being in thermal contact with said substance in said first unit, the other end of said bar extending into said second unit and being in thermal contact with said substance in said second unit, a slider movably mounted on said bar and adjustable along the length of said bar within said compartment, and temperature sensor means attached to said slider and movable therewith in thermal contact with said bar, whereby said temperature sensor means is adjustable to register a substantially constant temperature reference within a range of temperature determined by the temperatures of said substances.

7. An adjustable voltage reference providing a substantially constant voltage reference adjustable over a pre-determined range comprising, a first unit containing a substance in a solid-liquid state at one temperature, a second unit containing a substance in a solid-liquid state at a second temperature, means for maintaining said substances at substantially constant temperature, heat responsive means connected between said first and second units, said heat responsive means comprising a heat conductive means having opposite end portions in thermal contact with each said substance in each said unit, a first temperature sensor movably mounted on said heat conductive means and in thermal relation therewith, a second temperature sensor device in thermal relation with said substance in said first unit, and means connecting said first and second temperature sensors whereby a variable voltage output is obtained therefrom.

8. An adjustable reference device for providing a substantially constant temperature adjustable over a predetermined range comprising heat responsive means, means for holding the opposite end portions of said heat responsive means at different, substantially constant temperatures, said heat responsive means including a heat conductive means and a temperature sensitive means moveable along said heat conductive means, whereby the temperature along said heat responsive means varies continuously over a range determined by the temperatures at said opposite end portions.

9. An adjustable reference device as claimed in claim 8 in which said heat responsive means further comprises a second temperature means which is held at the substantially constant temperature of one of said end portions.

10. An adjustable reference device comprising heat responsive means for providing a temperature which is adjustable over a pre-determined range, means including substances in a solid-liquid state for holding opposite end portions of said heat responsive means at different, substantially constant temperatures, said heat responsive means being so designed that the temperature varies continuously along said heat responsive means over a range determined by the temperatures at said opposite end portions, and means for holding each said substance at a substantially constant temperature.

References Cited in the file of this patent
UNITED STATES PATENTS

| | | |
|---|---|---|
| 1,184,430 | Khotinsky | May 23, 1916 |
| 1,261,086 | Wilson et al. | Apr. 2, 1918 |
| 1,515,199 | Hands | Nov. 11, 1924 |
| 1,893,847 | Simpson | Jan. 10, 1933 |
| 2,149,729 | Finch | Mar. 7, 1939 |
| 2,524,886 | Colander et al. | Oct. 10, 1950 |
| 2,528,377 | Maltby | Oct. 31, 1950 |
| 2,595,814 | Rich et al. | May 6, 1952 |
| 2,640,089 | Gilbert | May 26, 1953 |
| 2,658,380 | Evans | Nov. 10, 1953 |